US010420392B2

(12) United States Patent
Foxen

(10) Patent No.: US 10,420,392 B2
(45) Date of Patent: Sep. 24, 2019

(54) SOLE STRUCTURE WITH INTEGRATED CLEAT MEMBER AND METHODS OF MAKING

(71) Applicant: NIKE, Inc., Beaverton, OR (US)

(72) Inventor: Thomas C. Foxen, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 291 days.

(21) Appl. No.: 15/443,230

(22) Filed: Feb. 27, 2017

(65) Prior Publication Data

US 2017/0164690 A1 Jun. 15, 2017

Related U.S. Application Data

(62) Division of application No. 13/487,962, filed on Jun. 4, 2012, now Pat. No. 9,615,621.

(51) Int. Cl.
*A43B 13/22* (2006.01)
*A43B 5/02* (2006.01)
(Continued)

(52) U.S. Cl.
CPC ............ *A43B 13/223* (2013.01); *A43B 5/001* (2013.01); *A43B 5/002* (2013.01); *A43B 5/02* (2013.01); *A43B 5/06* (2013.01); *A43B 5/14* (2013.01); *A43B 13/026* (2013.01); *A43B 13/04* (2013.01); *A43B 13/12* (2013.01); *A43B 13/122* (2013.01); *A43B 13/14* (2013.01); *A43B 13/146* (2013.01); *A43B 13/26* (2013.01); *A43B 13/41* (2013.01); *A43B 13/42* (2013.01); *A43C 15/161* (2013.01);
(Continued)

(58) Field of Classification Search
CPC ....... A43B 13/233; A43B 5/001; A43B 5/002; A43B 5/02; A43B 5/06; A43B 5/14; A43B 13/026; A43B 13/04; A43B 13/12; A43B 13/122; A43B 13/14; A43B 13/146; A43B 13/26; A43B 13/41; A43B 13/42; B29D 35/0054; B29D 35/04; B29D 35/122; B29D 35/142
See application file for complete search history.

(56) References Cited

U.S. PATENT DOCUMENTS 4,348,003 A * 9/1982 Beneteau .......... B29C 45/14778
249/142
5,720,118 A * 2/1998 Mayer ..................... A43B 5/00
36/107
(Continued)

FOREIGN PATENT DOCUMENTS

| JP | H02136506 U | 11/1990 |
| WO | 2006129837 A1 | 12/2006 |
| WO | WO 2011/124845 | * 10/2011 |

*Primary Examiner* — Austin Murata
(74) *Attorney, Agent, or Firm* — Quinn IP Law

(57) ABSTRACT

A sole structure with an integrated cleat member includes a plate member with a protruding portion that forms a first portion of the cleat member. A second portion of the cleat member is attached to the first portion and may be made of a less rigid material than the first portion. A supporting structure can be disposed inside the protruding portion. A method of forming the sole structure can include reshaping a portion of a plate member to form a protruding portion, molding a cleat tip portion onto the protruding portion and molding a supporting structure into a concave inner portion of the protruding portion.

19 Claims, 12 Drawing Sheets

(51) Int. Cl.
*A43B 13/02* (2006.01)
*A43B 13/04* (2006.01)
*A43B 13/12* (2006.01)
*A43B 13/14* (2006.01)
*A43B 13/26* (2006.01)
*A43B 13/41* (2006.01)
*A43B 13/42* (2006.01)
*A43C 15/16* (2006.01)
*B29D 35/00* (2010.01)
*B29D 35/04* (2010.01)
*B29D 35/12* (2010.01)
*B29D 35/14* (2010.01)
*A43B 5/00* (2006.01)
*A43B 5/06* (2006.01)
*A43B 5/14* (2006.01)
*B29K 75/00* (2006.01)
*B29K 105/04* (2006.01)

(52) U.S. Cl.
CPC ........ *A43C 15/162* (2013.01); *B29D 35/0054* (2013.01); *B29D 35/04* (2013.01); *B29D 35/122* (2013.01); *B29D 35/142* (2013.01); *B29K 2075/00* (2013.01); *B29K 2105/04* (2013.01)

(56) References Cited

U.S. PATENT DOCUMENTS

| 6,145,221 | A | * | 11/2000 | Hockerson | A43B 5/02 |
| | | | | | 36/126 |
| 6,954,998 | B1 | * | 10/2005 | Lussier | A43B 5/02 |
| | | | | | 36/107 |
| 8,713,819 | B2 | * | 5/2014 | Auger | A43B 5/02 |
| | | | | | 36/102 |
| 2006/0265902 | A1 | * | 11/2006 | Kita | A43B 13/10 |
| | | | | | 36/12 |
| 2009/0293315 | A1 | | 12/2009 | Auger et al. | |
| 2013/0055594 | A1 | * | 3/2013 | Hochart | A43B 7/1415 |
| | | | | | 36/103 |
| 2013/0340295 | A1 | * | 12/2013 | Adami | A43B 5/02 |
| | | | | | 36/25 R |

\* cited by examiner

SOLE STRUCTURE WITH INTEGRATED CLEAT MEMBER AND METHODS OF MAKING

CROSS-REFERENCE TO RELATED APPLICATIONS

This application is a divisional patent application of U.S. patent application Ser. No. 13/487,962, filed on Jun. 4, 2012.

BACKGROUND

The embodiments relate generally to a sole structure with an integrated cleat member and methods of making the sole structure with the integrated cleat member.

Articles of footwear having an outsole with cleats have previously been proposed. In many cases, the outsole and cleat portions are frequently subjected to intense forces and stresses caused by repeated impact with the ground. In some cases, cleats penetrate the ground surface exposing the cleats and outsole to even more stress.

SUMMARY

In one aspect, a method of making a sole structure includes reshaping a portion of a plate member to form a protruding portion for a cleat member, where the protruding portion has a convex outer portion and a concave inner portion. The method also includes forming a hole in the protruding portion, where the hole provides fluid communication between the outer portion and the inner portion. The method also includes molding a cleat tip portion onto the outer portion and molding a supporting structure within the inner portion. The cleat tip portion is connected to the supporting structure through the hole.

In another aspect, a method of making a sole structure includes reshaping a portion of a plate member to form a protruding portion for a cleat member, where the protruding portion has a convex outer portion and a concave inner portion. The method also includes filling the inner portion with a molding material to form a supporting structure. The plate member is substantially more rigid than the supporting structure.

In another aspect, a sole structure includes a plate member made of a first material, where the plate member has an upper surface and a lower surface. The sole structure also includes a cleat member, where the cleat member further includes: a first portion that is integrally formed with the plate member and includes a concave inner portion on the upper surface of the plate member and a convex outer portion on the lower surface of the plate member; a second portion attached to the first portion, where the second portion is made of a second material; and a support structure filling at least a portion of the concave inner portion, where the support structure is made of a third material. The first material is substantially more rigid than the second material and the first material is substantially more rigid than the third material.

Other systems, methods, features, and advantages of the current embodiments will be, or will become, apparent to one of ordinary skill in the art upon examination of the following figures and detailed description. It is intended that all such additional systems, methods, features and advantages be included within this description and this summary, be within the scope of the current embodiments, and be protected by the following claims.

BRIEF DESCRIPTION OF THE DRAWINGS

Embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

DETAILED DESCRIPTION

The following discussion and accompanying figures disclose a sole structure for an article of footwear. Concepts associated with the sole structure may be applied to a variety of athletic footwear types, including soccer shoes, running shoes, baseball shoes, basketball shoes, cross-training shoes, cycling shoes, football shoes, golf shoes, tennis shoes, walking shoes, and hiking shoes and boots, for example. The concepts may also be applied to footwear types that are generally considered to be non-athletic, including dress shoes, loafers, sandals, and work boots. Accordingly, the concepts disclosed herein apply to a wide variety of footwear types.

Figure 1:
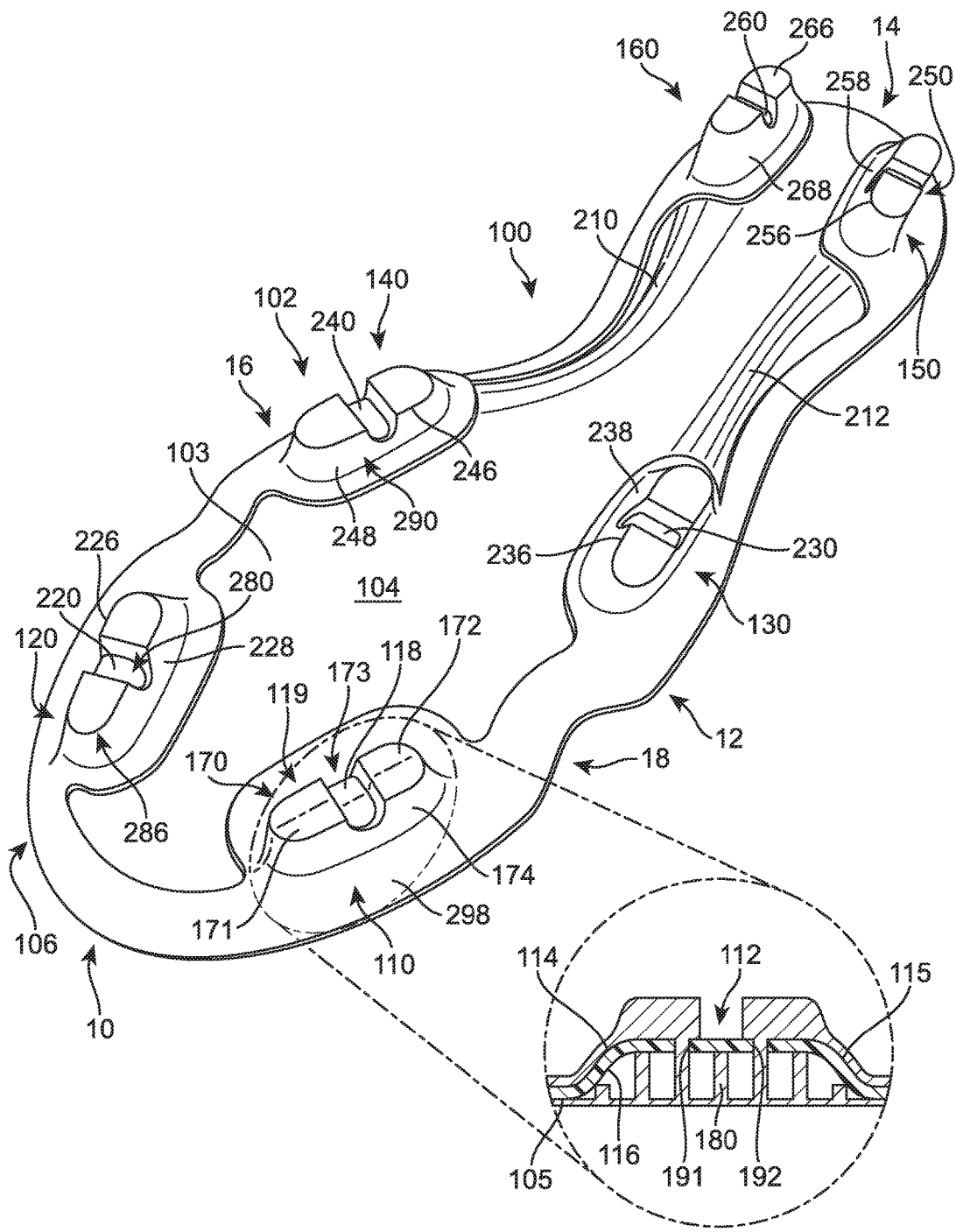
FIG. 1 is an isometric view of a lower surface of an embodiment of a sole member.
Figure 2:
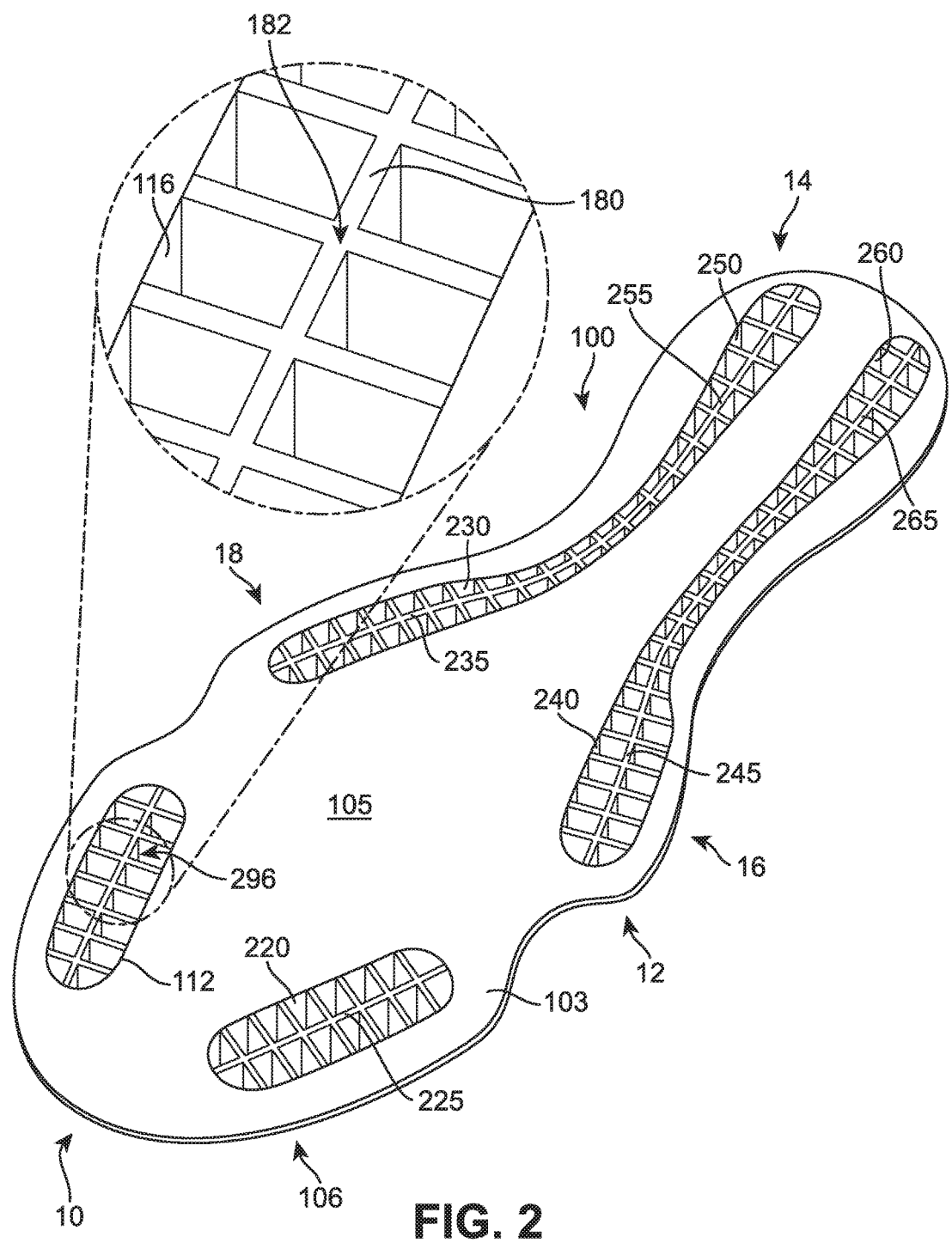
FIG. 2 is a top isometric view of an embodiment of a sole member.

FIGS. 1 and 2 illustrate isometric views of an embodiment of sole structure 100. In particular, FIG. 1 illustrates an isometric view of a bottom side of sole structure 100, while FIG. 2 illustrates an isometric view of a top side of sole structure 100. For purposes of illustration, sole structure 100 is shown in isolation in FIGS. 1 and 2. In some embodiments, sole structure 100 could be incorporated into the sole of an article and/or associated with an upper. Sole structure 100 may generally comprise any portion of a sole for an article of footwear. For example, in some cases, sole structure 100 could comprise a portion of an insole. In other cases, sole structure 100 could comprise a portion of a midsole. In one embodiment, sole structure 100 could comprise an outsole for an article that is configured to come into contact with a ground surface. In some embodiments, sole structure 100 may form the entire outsole of an article of footwear. In other embodiments, sole structure 100 may form only a portion of an outsole of an article of footwear. Moreover, in cases where sole structure 100 comprises an outsole, sole structure 100 could be attached to any other component of a sole structure (such as a midsole or insole). In other cases, sole structure 100 could be attached directly to an upper of an article of footwear. Additionally, in other embodiments, different configurations of sole structure 100 may be included in an article of footwear.

For purposes of reference, components of sole structure 100 may be divided into forefoot portion 10, midfoot portion 12 and heel portion 14. Forefoot portion 10 may be generally associated with the toes and joints connecting the metatarsals with the phalanges. Midfoot portion 12 may be generally associated with the arch of a foot. Likewise, heel portion 14 may be generally associated with the heel of a foot, including the calcaneus bone. In addition, sole structure 100 may include lateral side 16 and medial side 18. In particular, lateral side 16 and medial side 18 may be opposing sides of sole structure 100. Furthermore, both lateral side 16 and medial side 18 may extend through forefoot portion 10, midfoot portion 12 and heel portion 14.

It will be understood that forefoot portion 10, midfoot portion 12 and heel portion 14 are only intended for purposes of description and are not intended to demarcate precise regions of sole structure 100. Likewise, lateral side 16 and medial side 18 are intended to represent generally two sides of a sole structure, rather than precisely demarcating sole structure 100 into two halves. In addition, forefoot portion 10, midfoot portion 12 and heel portion 14, as well as lateral side 16 and medial side 18, can also be applied to individual components of a sole structure, such as a sockliner, insole or any other component.

For consistency and convenience, directional adjectives are employed throughout this detailed description corresponding to the illustrated embodiments. The term "longitudinal" as used throughout this detailed description and in the claims refers to a direction extending a length of a component. In some cases, the longitudinal direction may extend from a forefoot portion to a heel portion of the sole structure. Also, the term "lateral" as used throughout this detailed description and in the claims refers to a direction extending a width of the sole structure. In other words, the lateral direction may extend between a medial side and a lateral side of the sole structure. Furthermore, the term "vertical" as used throughout this detailed description and in the claims refers to a direction generally perpendicular to a lateral and longitudinal direction. For example, in cases where a sole structure is planted flat on a ground surface, the vertical direction may extend from the ground surface upward. In addition, the term "proximal" refers to a portion of a footwear component that is closer to a portion of a foot when an article of footwear is worn. Likewise, the term "distal" refers to a portion of a footwear component that is further from a portion of a foot when an article of footwear is worn. It will be understood that each of these directional adjectives may be applied to individual components of an article and/or a sole structure.

In some embodiments, sole structure 100 may comprise plate member 103. In some cases, plate member 103 can be a full length plate member, including a forefoot portion, a midfoot portion and a heel portion. In other cases, however, plate member 103 may be a partial length plate member. For example, in some cases, plate member 103 may only extend through the forefoot of an article of footwear.

In some embodiments, sole structure 100 can include a plurality of cleat members 102 disposed on lower surface 104 of plate member 103. Generally, the term "cleat member" as used throughout this detailed specification and throughout the claims includes any provision disposed on a sole structure for increasing traction through friction or penetration of a ground surface. In the current embodiment, plurality of cleat members 102 includes first cleat member 110, second cleat member 120, third cleat member 130, fourth cleat member 140, fifth cleat member 150, and sixth cleat member 160. Although the current embodiment includes six cleat members, in other embodiments, cleat members 102 could include less than six cleat members. In still other embodiments, cleat members 102 could include more than six cleat members.

Generally, cleat members 102 could be disposed in any arrangement on plate member 103. In some cases, some of cleat members 102 could be disposed in forefoot portion 10. In other cases, some of cleat members 102 could be disposed in midfoot portion 12. In some cases, some of cleat members 102 could be disposed in heel portion 14. In one embodiment, first cleat member 110 and second cleat member 120 are disposed in forefoot portion 10. Also, in one embodiment, third cleat member 130 and fourth cleat member 140 are disposed in midfoot portion 12. Additionally, in one embodiment, fifth cleat member 150 and sixth cleat member 160 are disposed in heel portion 14. However, any other arrangement of cleat members 102 are possible. For example, the current embodiment includes cleat members that are disposed on a peripheral portion 106 of plate member 103. In other cases, however, some cleat members could be disposed more centrally on plate member 103.

It will be understood that the embodiments are not limited to cleat members having a particular shape and/or geometry. For example, some embodiments could incorporate cleat members having different geometries and/or shapes, which may be selected according to various factors including desired traction properties, weight properties, stability properties as well as possible other factors. In some cases, for example, the geometry and/or shape of one or more cleat members could vary according to the intended sport for which sole structure 100 may be used. In particular, the geometry and/or shape of one or more cleat members could be selected according to whether sole structure 100 is intended for use in football, soccer, baseball, golf as well as possibly other sports, as each sport may be associated with cleats having particular geometric characteristics.

Some embodiments may include provisions for reducing the overall weight of sole structure 100 while maintaining durability of cleat members 102. In some cases, for example, a portion of a cleat member could be integrally formed with a plate member. In some cases, a portion of a cleat member can comprise a protruding portion that is integral with a plate member.

In some embodiments, plate member 103 includes protruding portion 112 (shown in an enlarged cross-section within FIG. 1) that is integrally formed with plate member 103. Protruding portion 112 may include an outer portion 114 that extends out in a convex manner from lower surface 104 of plate member 103. Protruding portion 112 may also include an inner portion 116 that is recessed in a concave manner with respect to upper surface 105 of plate member 103. With this configuration, protruding portion 112 provides an integrally formed first portion 118 for first cleat member 110 that extends outwardly from lower surface 104 of plate member 103.

In some embodiments, first cleat member 110 further includes second portion 119. In some cases, second portion 119 comprises first pair of cleat tip portions 170. First pair of cleat tip portions 170 includes first cleat tip portion 171 and second cleat tip portion 172 that are spaced apart by gap 173. In other embodiments, second portion 119 could include a single cleat tip portion. In still other embodiments, second portion 119 could include three or more distinct cleat tip portions.

In some embodiments, second portion 119 can also include connecting portion 174. In some cases, connecting portion 174 wraps around sidewalls 115 of protruding portion 112. Connecting portion 174 may be configured to connect first cleat tip portion 171 with second cleat tip portion 172. Moreover, in some cases, connecting portion 174 can provide a connection between pair of cleat tip portions 170 and any other portions of sole member 100.

A sole member can include provisions for increasing the strength of a protruding portion. In some embodiments, a protruding portion can be configured with a supporting structure. A supporting structure can be any structure configured to reinforce or otherwise enhance support for a protruding portion. In some cases, a supporting structure can also help to anchor one or more cleat tip portions to a protruding portion.

In some embodiments, protruding portion 112 can be associated with first supporting structure 180. In some cases, first supporting structure 180 may comprise a lattice like structure that is disposed within inner portion 116 of protruding portion 112. In some cases, first supporting structure 180 comprises a plurality of intersecting ribs or walls that are arranged approximately along the longitudinal and lateral directions of protruding portion 112.

In different embodiments, the geometry of supporting structure 180 can vary. Any three-dimensional geometry and/or two-dimensional geometry could be used for supporting structure 180. In some cases, supporting structure 180 has a square or rectangular lattice-like cross-sectional geometry. In other cases, supporting structure 180 could have a hexagonal lattice-like, or honeycomb shaped, cross-sectional geometry. In still other cases, the cross-sectional geometry could be associated with any other shapes including triangles, rectangles, circles, ellipses, polygons, regular shapes as well as irregular shapes. Moreover, the pattern associated with supporting structure 180 could be constant or could vary over different regions. It will be understood that the geometry of a supporting structure could be selected according to the desired strength characteristics for a protruding portion as well as the geometry of the protruding portion.

In some embodiments, supporting structure 180 could extend throughout the substantial entirety of inner portion 116. In other cases, supporting structure 180 could extend through only a part of inner portion 116. In some cases, a supporting structure 180 could have a variable height that is contoured to fit the shape of inner portion 116. In some cases, surface 182 of supporting structure 180 could be approximately flush with upper surface 105 of plate member 103.

In some embodiments, protruding portion 112 can include first hole 191 and second hole 192. In some cases, supporting structure 180 and first pair of cleat tip portions 170 can be connected through first hole 191 and second hole 192. In some cases, first pair of cleat tip portions 170 and supporting structure 180 comprise a substantially continuous material portion that are joined through first hole 191 and second hole 192. This arrangement helps to anchor pair of cleat tip portions 170 to protruding portion 112.

In some embodiments, each of the remaining cleat members may be configured in a similar manner to first cleat member 110. For example, each of second cleat member 120, third cleat member 130, fourth cleat member 140, fifth cleat member 150 and sixth cleat member 160 include corresponding protruding portion 220, protruding portion 230, protruding portion 240, protruding portion 250 and protruding portion 260, respectively, which may be collectively referred to along with protruding portion 112 as protruding portions 280. Each protruding portion includes a corresponding convex outer portion along lower surface 104 and a corresponding concave inner portion along upper surface 105. In some cases, protruding portion 240 and protruding portion 260 could be continuous with one another, forming intermediate ridge portion 210 on lower surface 104. Likewise, in some cases, protruding portion 230 and protruding portion 250 could be continuous with one another, forming intermediate ridge portion 212 on lower surface 104. In other cases, however, plate member 103 may not include ridge portion 210 and/or ridge portion 212.

In some embodiments, each of second cleat member 120, third cleat member 130, fourth cleat member 140, fifth cleat member 150 and sixth cleat member 160 may include corresponding pair of tip portions 226, pair of tip portions 236, pair of tip portions 246, pair of tip portions 256 and pair of tip portions 266, respectively, which may be collectively referred to along with pair of tip portions 170 as plurality of cleat tip portions 286. In other embodiments, some cleat members can include cleat tip portions, while others may not include cleat tip portions. In other words, in some cases, cleat tip portions may be optional.

In some embodiments, each of second cleat member 120, third cleat member 130, fourth cleat member 140, fifth cleat member 150 and sixth cleat member 160 may include corresponding connecting portion 228, connecting portion 238, connecting portion 248, connecting portion 258 and connecting portion 268, respectively, which may be collectively referred to along with connecting portion 174 as plurality of connecting portions 290. In other embodiments, some cleat members can include connecting portions, while others may not include connecting portions. In other words, in some cases, connecting portions may be optional.

In some embodiments, each of cleat members 102 can also include a corresponding supporting structure. For example, in some cases, second cleat member 120, third cleat member 130, fourth cleat member 140, fifth cleat member 150 and sixth cleat member 160 may include corresponding supporting structure 225, supporting structure 235, supporting structure 245, supporting structure 255 and supporting structure 265, respectively, which may be referred to collectively as plurality of supporting structures 296. In other embodiments, some cleat members can include supporting structures, while others may not include supporting structures. In other words, in some cases, supporting structures may be optional.

Using this arrangement, each cleat member can be configured in a similar manner. In particular, each cleat member comprises a first portion that is integrally formed with a plate member and provides a base like protruding portion for the cleat. Additionally, each cleat member comprises a second portion that is attached to the first portion, where the second portion comprises cleat tip portions that further enhance the traction provided by the cleat member. Moreover, to reduce weight and maintain strength for each cleat member, each cleat member is formed with a hollow inner portion that is filled with a supporting structure. For example, plurality of protruding portions 280 are filled with plurality of supporting structures 296. The supporting structures help increase the structural integrity of the cleat member and can provide anchoring for cleat tip portions 286.

In some embodiments, plurality of cleat tip portions 286 may be integrally formed with plurality of connecting portions 290. Moreover, each of connecting portions 290 can be connected to peripheral layer 298 that extends around peripheral portion 106 of plate 103 on lower surface 104. In some cases, as discussed in further detail below, plurality of cleat tip portions 286, plurality of connecting portions 290 and peripheral layer 298 may comprise a single molded layer that is disposed over lower surface 104 of plate member 103. In other cases, however, some of these various portions may not be connected to one another.

FIGS. 3 through 10 are intended to illustrate one embodiment of a process for making a sole structure including integrated cleat members. In some embodiments, some of the steps associated with the process could be accomplished by a proprietor, a manufacturer, a retailer or any other entity. It will be understood that in some embodiments one or more of the steps associated with the process may be optional. In other embodiments, some additional steps could be included that are not discussed below. Additionally, the order of the steps discussed below could be rearranged in any desired manner.

In different embodiments, plate member 103 can comprise different materials with different characteristics. In some embodiments, plate member 103 can comprise a composite material. The term "composite material" as used throughout this detailed description and in the claims, refers to any material made from two or more materials with differing material properties that retain some amount of separation within the composite material. In some cases, plate member 103 may be made of a fiber-reinforced composite material including short fiber-reinforced materials and continuous fiber-reinforced materials. Examples of fiber-reinforced materials include, but are not limited to: wood, carbon-fiber reinforced plastics and glass reinforced plastics. In one embodiment, plate member 103 comprises a carbon fiber reinforced composite. An exemplary composite structure is disclosed in Auger, U.S. Pat. No. 7,832,117, issued Nov. 16, 2010, the entirety of which is hereby incorporated by reference. In other cases, however, plate member 103 could be made of any other materials, including materials with relatively high rigidities or materials with relatively low rigidities.

In some cases, cleat tip portions 286, connecting portions 290 and/or supporting structures 296 may comprise substantially similar materials. Examples of materials that could be used for these components include, but are not limited to: plastics, rubbers, metals as well as any other materials. In one embodiment, each of cleat tip portions 286, connecting portions 290 and supporting structures 296 may comprise a relatively soft and/or flexible plastic material, such as thermoplastic polyurethane (TPU). In other embodiments, these different portions could comprise different materials. For example, cleat tip portions 286 and supporting structures 296 could be made of substantially different plastic materials.

The arrangement described above provides an integrated cleat member with a strong base (a protruding portion) that is integrally formed with substantially rigid composite plate. This arrangement further provides a cleat member with a more flexible cleat tip that provides for adaptability of the cleat tip on different kinds of surfaces and enhances penetration into a ground surface.

Figure 3:
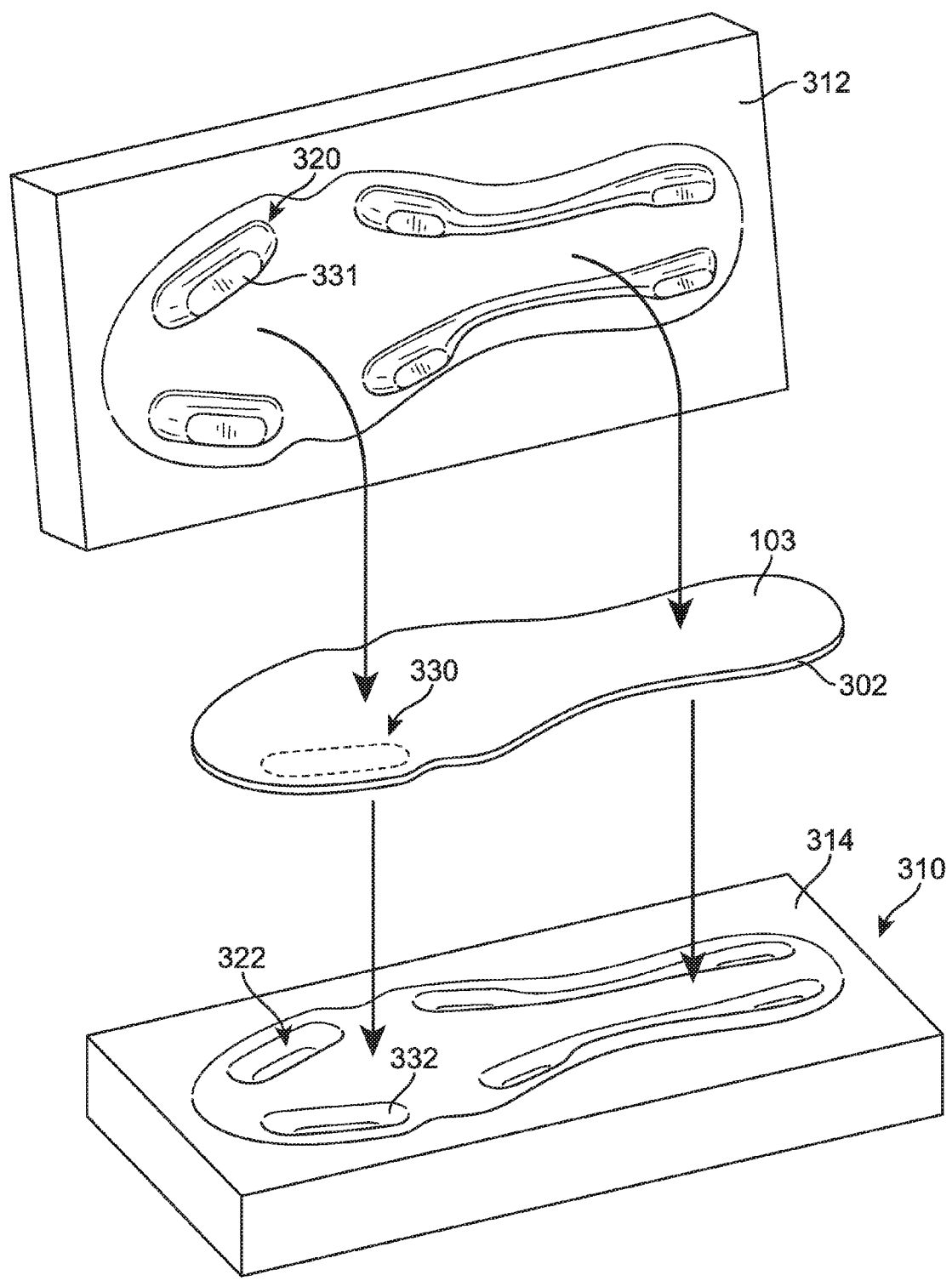
FIG. 3 is a schematic view of an embodiment of a shaping assembly for forming protruding portions on a plate member.
Figure 4:
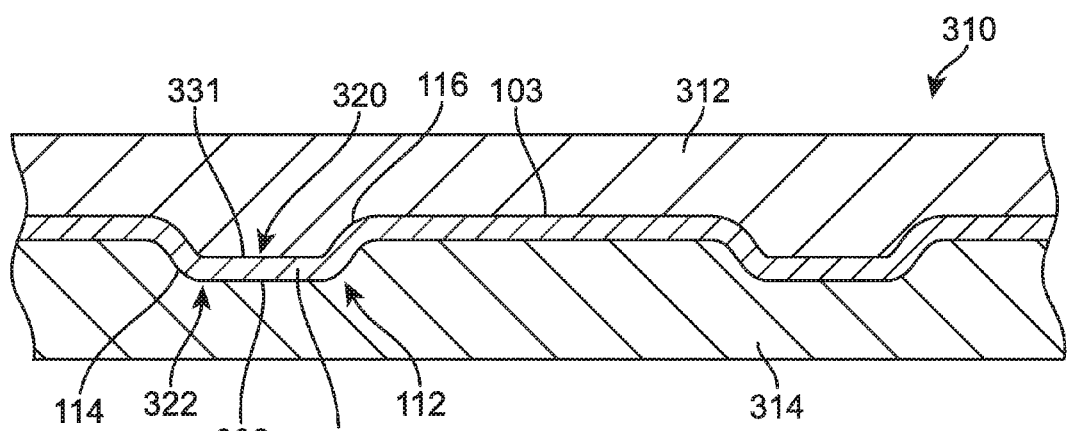
FIG. 4 is a cross sectional view of an embodiment of a shaping assembly with a plate member inserted between a top molding plate and a bottom molding plate.

FIGS. 3 and 4 illustrate schematic views of an embodiment of a process for forming a plurality of protruding portions on a plate member. Initially, as seen in FIG. 3, plate member 103 could be associated with shaping assembly 310. Initially, plate member 103 could be configured with any geometry. In some cases, plate member 103 may have any approximately two-dimensional geometry, such that the width and length are substantially greater than the depth of plate member 103. In other cases, the depth of plate member 103 could vary such that plate member 103 is better described as three-dimensional. In some embodiments, plate member 103 could have a substantially flat geometry. For example, in one embodiment, plate member 103 comprises a substantially flat layer. In other embodiments, however, plate member 103 could have a curved or contoured geometry. For example, in some cases, plate member 103 could be pre-shaped with the geometry of an outsole including a contoured periphery that slopes upwardly towards a midsole component or upper of an article of footwear.

As seen in FIG. 3, in an exemplary embodiment, plate member 103 may have a substantially flat geometry without any protrusions. In some cases, the geometry of plate member 103 could be slightly contoured. Additionally, in some cases, plate member 103 could be pre-shaped to have an outer edge 302 that has the approximate shape of an outsole or other sole component.

It will be understood that in other embodiments, rather than starting with a substantially flat plate member 103, other embodiments of the method could start with a stock material that needs to be re-shaped and also cut. For example, in some cases, a rectangular sheet of stock composite material may be shaped using shaping assembly 310 and then cut to the shape of an outsole or other sole component.

Shaping assembly 310 can be any machine or device known in the art for shaping or otherwise deforming various different kinds of materials including rigid materials. In some cases, shaping assembly 310 comprises a press that is configured to re-shape one or more portions of a rigid material using pressure and/or heat. In particular, shaping assembly 310 could include a top molding portion and a bottom molding portion that are used to reshape a rigid material. In some embodiments, shaping assembly 310 may use pressure to reshape portions of plate member 103. In some cases, shaping assembly 310 may use heat to reshape portions of plate member 103. In some cases, shaping assembly 310 may use heat and pressure to reshape portions of plate member 103. In one embodiment, shaping assembly 310 could be part of a device that uses an autoclave molding technique to shape composite materials.

In one embodiment, shaping assembly 310 comprises top molding plate 312 and bottom molding plate 314. In some cases, top molding plate 312 and bottom molding plate 314 provide molding surfaces that can be used to reshape on one or more portions of plate member 103. In some cases, top molding plate 312 could be provided with protrusions 320. Additionally, bottom molding plate 314 could be provided with recesses 322 that correspond with protrusions 320. As seen in FIGS. 3 and 4, to form protrusions in plate member 103, protrusions 320 and recesses 322 of top molding plate 312 and bottom molding plate 314 may be aligned on opposing sides of plate member 103. As top molding plate 312 and bottom molding plate 314 are pressed together, protruding portions 280 are formed. For example, in one embodiment, first portion 330 of plate member 103 is aligned with first protruding portion 331 of top molding plate 312 and first recess 332 of bottom molding plate 314. As top mold 312 and bottom bold 314 are pressed together, first portion 330 is reshaped to form first protruding portion 112, including concave inner portion 116 and convex outer portion 114.

Each of the remaining protruding portions discussed above, including second protruding portion 220, third protruding portion 230, fourth protruding portion 240, fifth protruding portion 250 and sixth protruding portion 260 (see FIG. 1) can be formed in a similar manner using corresponding protrusions 320 and recesses 322 of shaping assembly 310. Although the current embodiment illustrates a process for forming a plurality of protruding portions simultaneously, in other embodiments two or more different protrusions can be formed during different steps. For example, in some cases, protruding portions can be formed one at a time by applying a shaping assembly to a localized region of a plate member.

It will be understood that in still other embodiments, a plate member or similar sole component could be molded from a liquid and/or foam molding material. For example, in some other cases, a molding assembly can be used to form a sole component from a rubber and/or plastic material.

Figure 5:
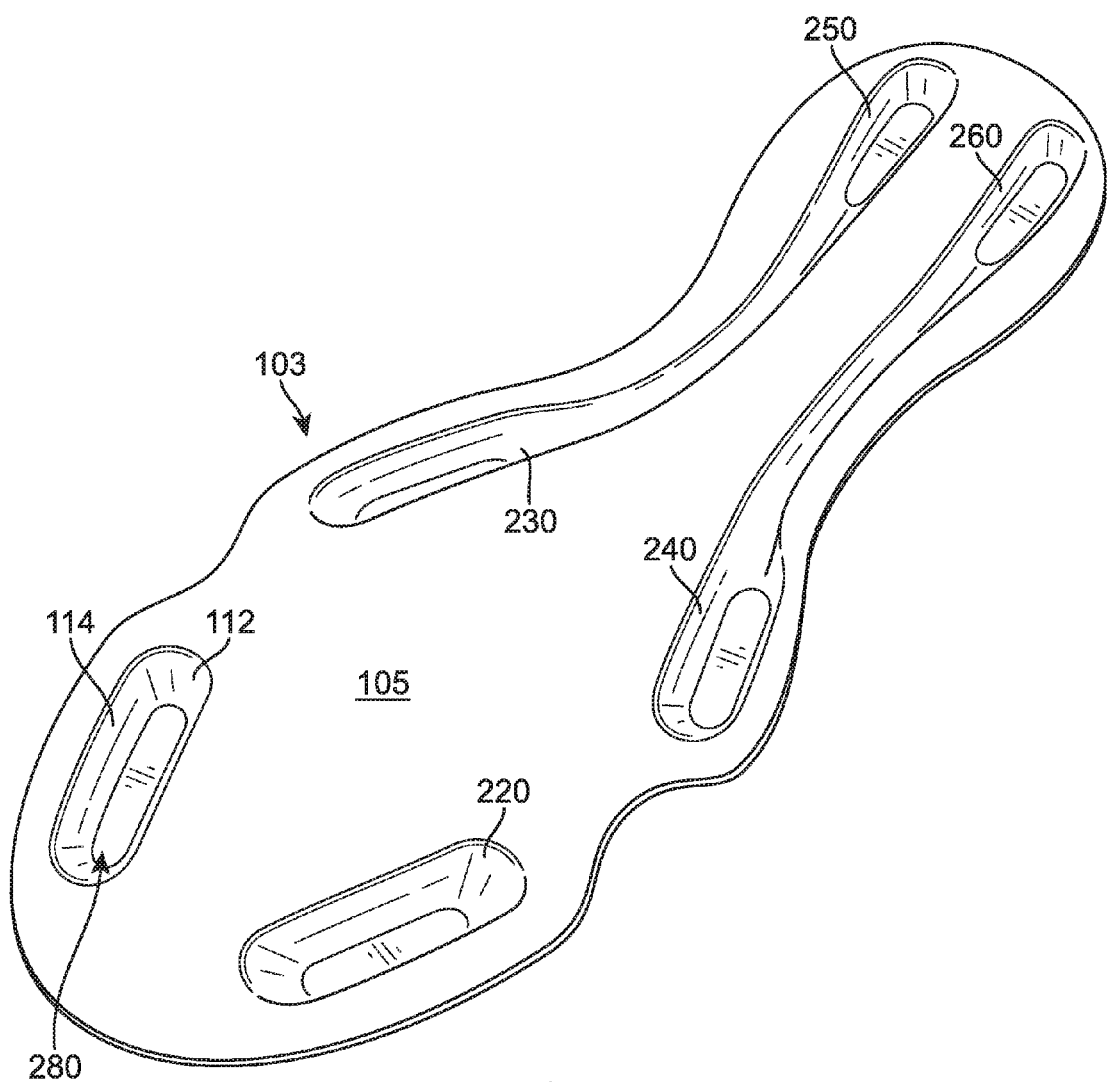
FIG. 5 is a top down isometric view of an embodiment of a plate member with a plurality of protruding portions.
Figure 6:
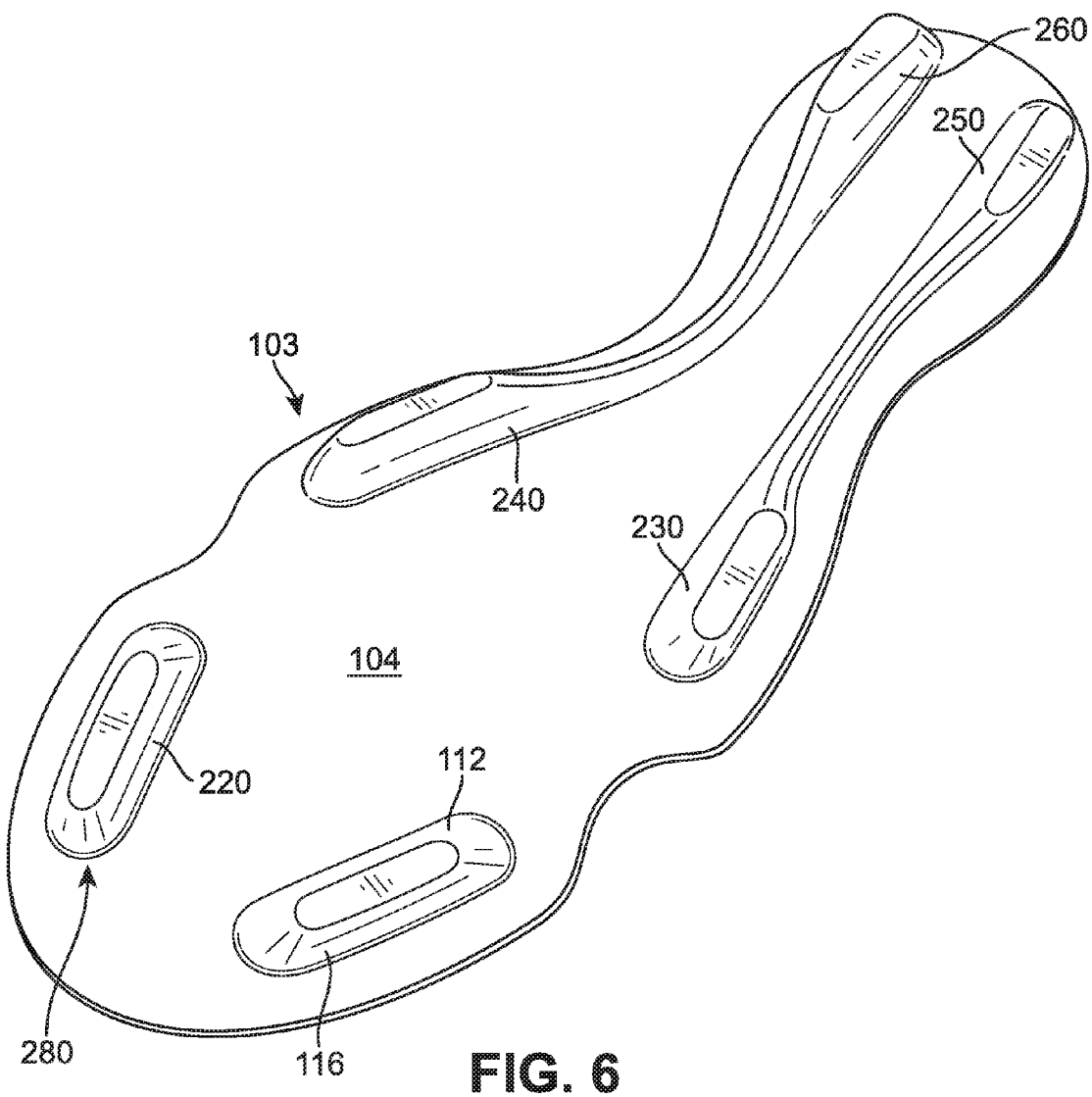
FIG. 6 is an isometric view of a lower surface of an embodiment of a plate member with a plurality of protruding portions.

FIGS. 5 and 6 illustrate isometric views of upper surface 105 and lower surface 104, respectively, of plate member 103 after being removed from shaping assembly 310. As seen in FIGS. 5 and 6, plate member 103 has been reshaped and includes protruding portions 280 that extend outwardly from lower surface 104. At this stage in the process, plate member 103 includes first protruding portion 112, second protruding portion 220, third protruding portion 230, fourth protruding portion 240, fifth protruding portion 250 and sixth protruding portion 260. Each protruding portion includes a corresponding inner concave portion and outer convex portion. For example, first protruding portion 112 includes inner portion 114 and outer portion 116.

Figure 7:
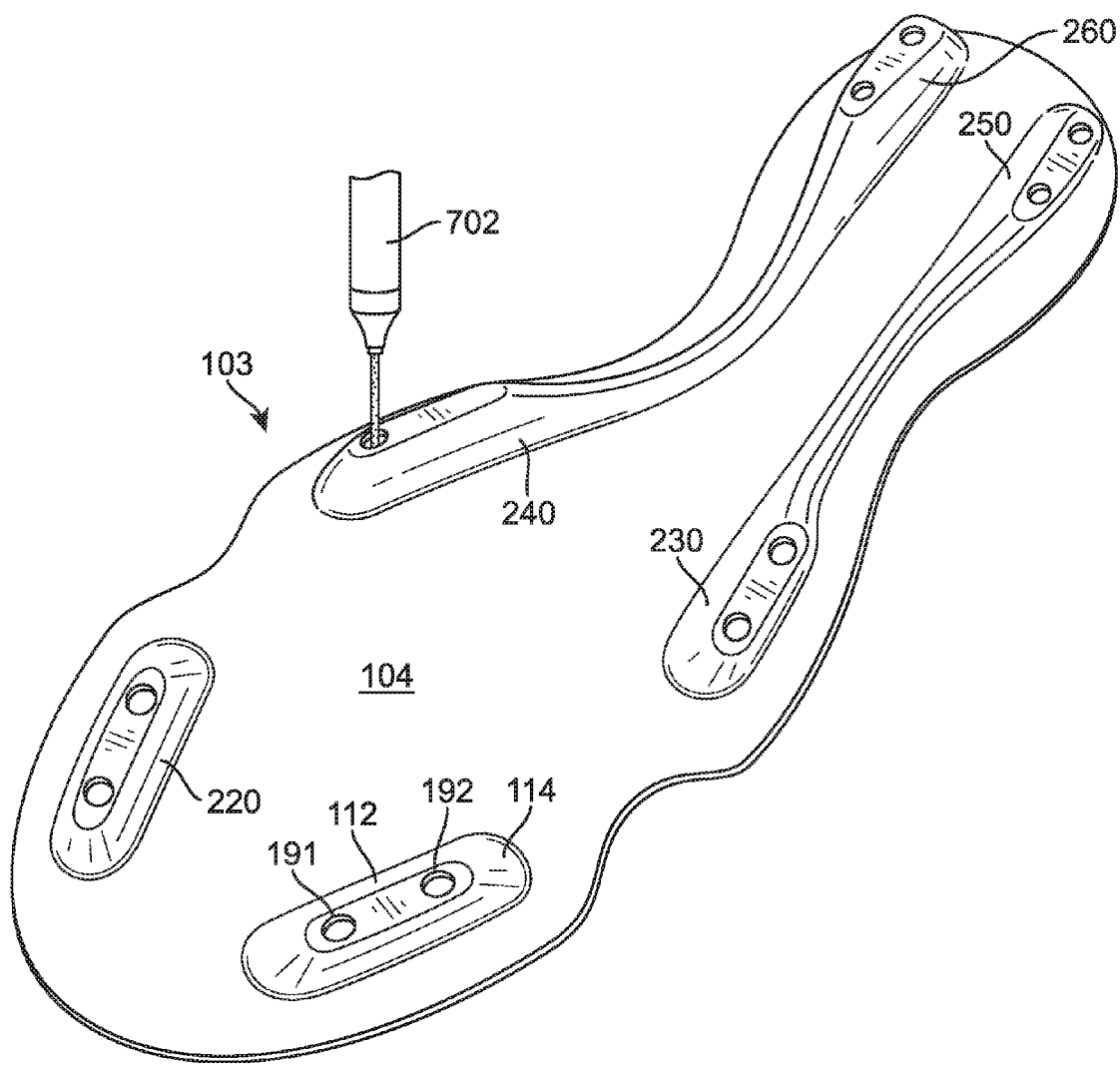
FIG. 7 is a schematic view of an embodiment of holes being formed in a plurality of protruding portions on a plate member.

FIG. 7 illustrates an embodiment of a possible step in the method where holes are formed in one or more protruding portions. In one embodiment, two holes are formed in each protruding portion. For example, in the current embodiment, first hole 191 and second hole 192 are formed in first protruding portion 112. In some cases, first hole 191 and second hole 192 may extend through the entire thickness of first protruding portion 112. This allows fluid communication between outer portion 114 and inner portion 116, as seen in FIG. 1. As seen in FIG. 7, holes may also be formed in each of second protruding portion 220, third protruding portion 230, fourth protruding portion 240, fifth protruding portion 250 and sixth protruding portion 260.

Although the current embodiment includes two holes for each protruding portion, in other embodiments any other number of holes could be used. In some cases, each protruding portion could include a single hole. In still other cases, each protruding portion could include more than two holes. Moreover, in some cases, some protruding portions could include holes, while other protruding portions may not include holes.

Generally, the shape and/or size of a hole can vary. In some embodiments, each hole may have an approximately circular shape. In other cases, however, each hole could have any other shape including, but not limited to: triangular shapes, rectangular shapes, oval shapes, polygonal shapes, regular shapes and/or irregular shapes. In addition, the size of each hole could be varied in any manner.

Methods for forming holes in a plate member can vary. In one embodiment, each hole may be formed using water jet cutter 702 that uses high pressure and high velocity water to cut through rigid materials. In other embodiments, however, holes could be formed using any other techniques known in the art including, but not limited to laser cutting techniques, drilling and punching. In still other embodiments, holes could be formed simultaneously with a protruding portion. For example, in an embodiment where a portion of a plate member is reshaped to form a protruding portion, a hole could be punched from the plate member as the protruding portion is being formed using a molding plate.

Figure 8:
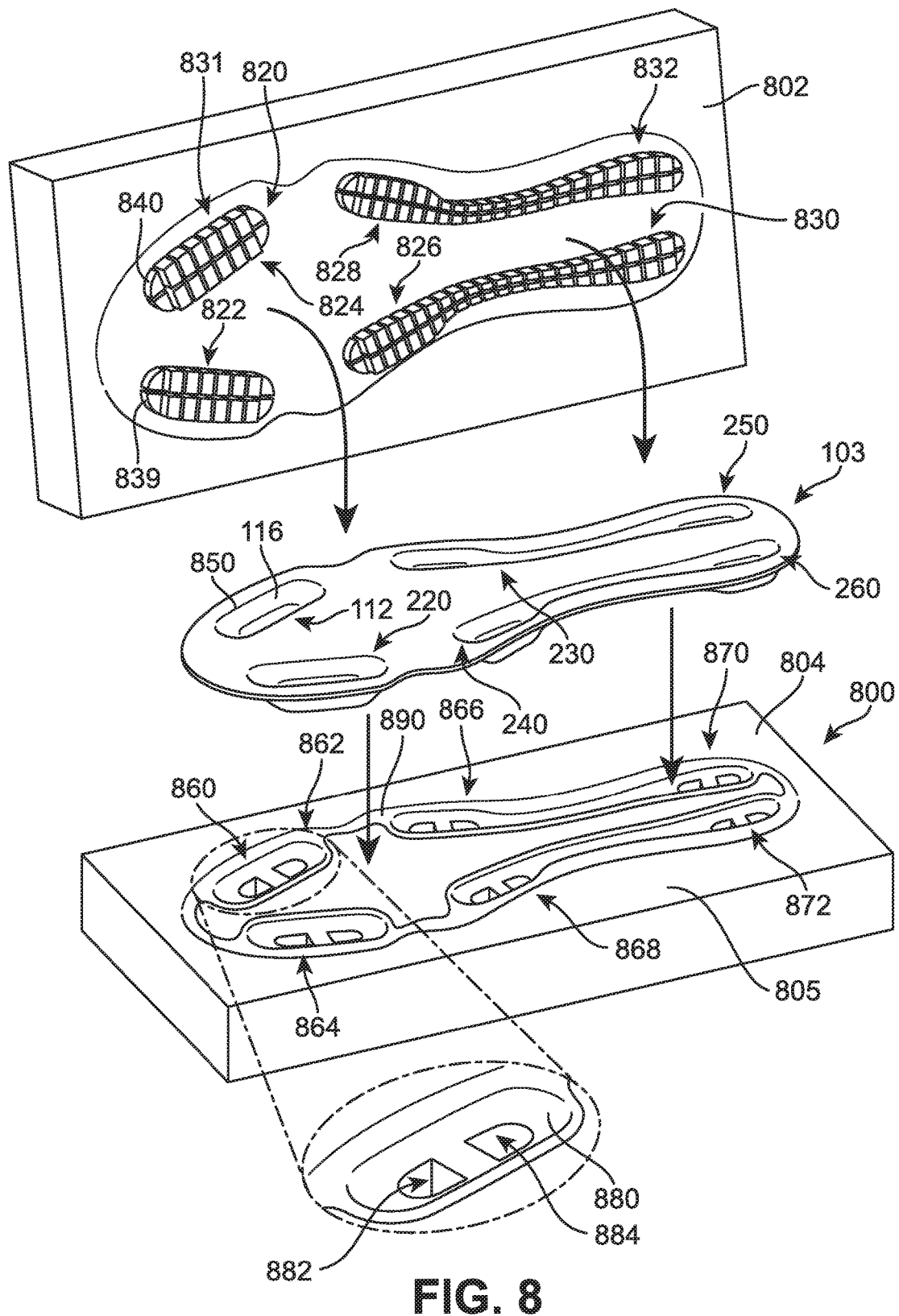
FIG. 8 is a schematic view of an embodiment of a molding assembly for a plate member.
Figure 9:
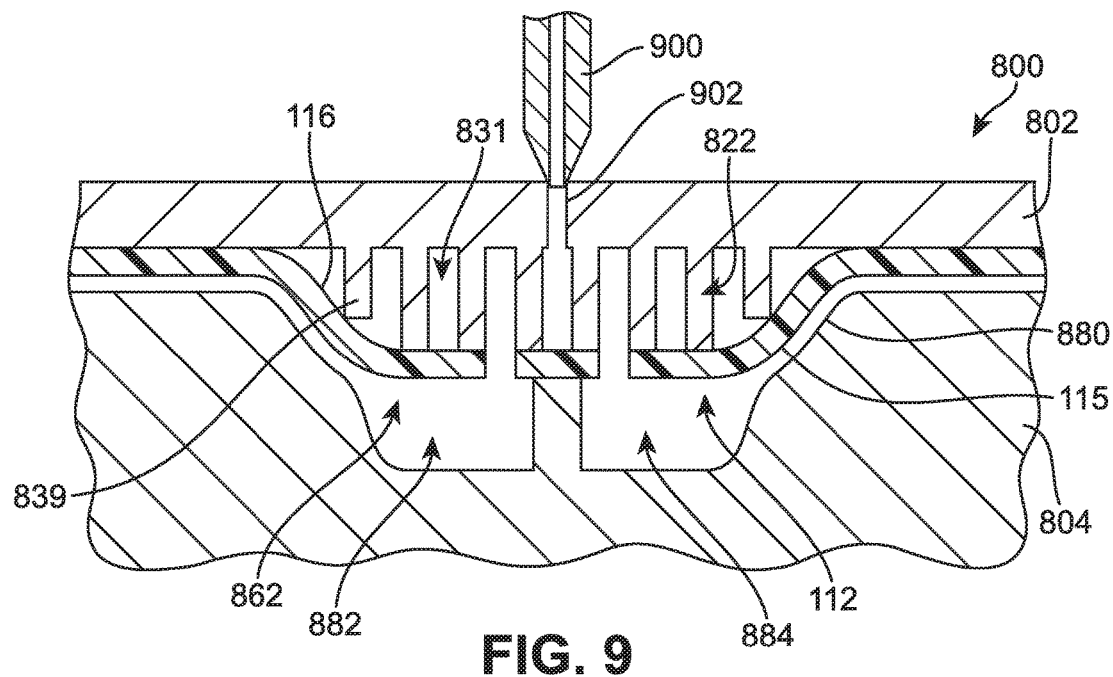
FIG. 9 is a cross sectional view of an embodiment of a portion of a plate member disposed between a top molding plate and a bottom molding plate.
Figure 10:
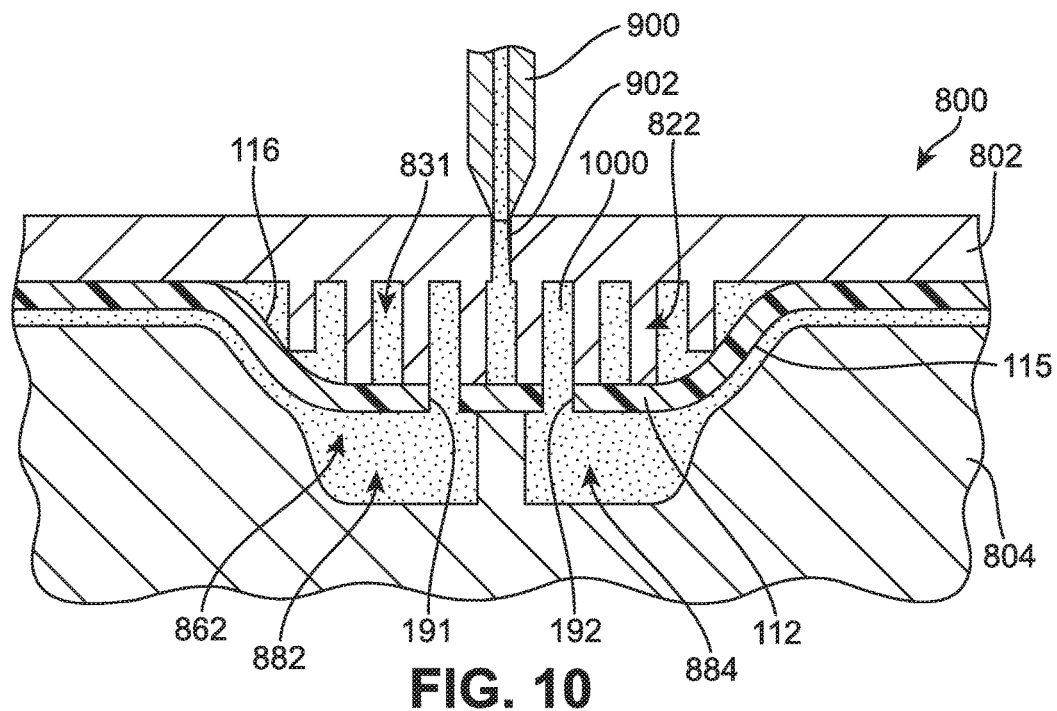
FIG. 10 is a cross sectional view of an embodiment of a portion of a plate member disposed between a top molding plate and a bottom molding plate with molding material filled in between the top molding plate and the bottom molding plate.

FIGS. 8-10 illustrate embodiments of a method of forming cleat tip portions and support structures on a plate member. In particular, FIG. 8 illustrates a schematic view of plate member 103 inserting into molding assembly 800, while FIGS. 9 and 10 illustrate cross sectional views of a protruding portion inside a portion of molding assembly 800.

Referring to FIG. 8, molding assembly 800 comprises top molding plate 802 and bottom molding plate 804. For purposes of illustration, molding assembly 800 is shown schematically in the current embodiment, however it will be understood that molding assembly 800 can be representative of any type of molding device, machine or system known in the art.

In some embodiments, top molding plate 802 is configured with provisions for forming supporting structures. In one embodiment, top molding plate 802 includes spacer portions 820. Spacer portions 820 comprise projections that extend outwardly from top molding plate 802. In some cases, spacer portions 820 are integrally formed with top molding plate 802. For example, in embodiments where top molding plate 802 comprises a metal material, spacer portions 820 may comprise a substantially similar metal material. In other cases, however, spacer portions 820 may not be integrally formed with top molding plate 802. In some other embodiments, for example, spacer portions 820 could be removable from top molding plate 802.

In some embodiments, spacer portions 820 are arranged in sets that correspond with each protruding portion of plate member 103. For example, first set of spacer portions 822 are configured to insert into inner portion 116 of first protruding portion 112, as shown in FIG. 9. Likewise, second set of spacer portions 824, third set of spacer portions 826, fourth set of spacer portions 828, fifth set of spacer portions 830 and sixth set of spacer portions 832 are configured to insert into second protruding portion 220, third protruding portion 230, fourth protruding portion 240, fifth protruding portion 250 and sixth protruding portion 260, respectively.

Each set of spacer portions may be configured to create a corresponding supporting structure during a molding process. For example, first set of spacer portions 822 includes spacer portions approximately aligned in two longitudinal rows and eight lateral rows. The spacer portions are separated by gaps 831 where molding material may be filled in between the spacer portions.

In some embodiments, the geometry of each spacer portion can be varied. In some embodiments, the shape of each spacer portion can be contoured so that each set of spacer portions has an overall shape corresponding to the approximate shape of an associated protruding portion. For example, in one embodiment, the spacer portions of first set of spacer portions 822 include contoured outer edges 840 that are contoured to the shape of outer edge 850 of first protruding portion 112. In some cases, the heights of one or more spacer portions could be constant. In other cases, the heights of one or more spacer portions could be varied to accommodate the contours of first protruding portion 112. In the current embodiment, the spacer portions of the majority of first set of spacer portions 822 have approximately constant heights. In this case, the outermost spacer portions 839 have shorter heights to accommodate the slope of inner portion 116, as seen in FIG. 9.

In some embodiments, bottom molding plate 804 includes provisions for forming cleat tip portions on lower surface 104 of plate member 103. In one embodiment, bottom molding plate 804 includes molding cavities 860. Molding cavities 860 comprise recesses that are sunken in from upper surface 805 of bottom molding plate 804. Molding cavities 860 may include first molding cavity 862, second molding cavity 864, third molding cavity 866, fourth molding cavity 868, fifth molding cavity 870 and sixth molding cavity 872, corresponding to first protruding portion 112, second protruding portion 220, third protruding portion 230, fourth protruding portion 240, fifth protruding portion 250 and sixth protruding portion 260, respectively.

In some embodiments, each molding cavity may be shaped to form corresponding cleat tip portions and connecting portions on a protruding portion. For example, first molding cavity 862 can include recessed portion 880 that may receive sidewall portions 115 of first protruding portion 112. In addition, first molding cavity 862 further includes first sub-recess 882 and second sub-recess 884, which are recessed with respect to recessed portion 880. First sub-recess 882 and second sub-recess 884 may be shaped to form first cleat tip portion 171 and second cleat tip portion 172 of first cleat member 110, as shown in FIG. 1.

Each of the remaining molding cavities 860 can be configured in a substantially similar manner to first molding cavity 862. In particular, each of second molding cavity 864, third molding cavity 866, fourth molding cavity 868, fifth molding cavity 870 and sixth molding cavity 872 can include similar recessed portions to form cleat tip portions and connecting portions on second protruding portion 220, third protruding portion 230, fourth protruding portion 240, fifth protruding portion 250 and sixth protruding portion 260, respectively.

In some embodiments, bottom molding plate 804 can also include peripheral cavity 890 that extends between molding cavities 860. Peripheral cavity 890 may be a relatively shallow cavity that is used to form peripheral layer 298 (see FIG. 1). In other embodiments, bottom molding plate 804 may not include peripheral cavity 890.

Referring to FIG. 9, with plate member 103 placed within molding assembly 800, first set of spacer portions 822 of top molding plate 802 are inserted into inner portion 116 of first protruding portion 112. Likewise, first protruding portion 112 is disposed within first molding cavity 862 of bottom molding plate 804. At this point, injection nozzle 900 may be aligned with an injecting port 902 of top molding plate 802.

For purposes of clarity, the current embodiment illustrates an injection port 902 associated with top molding plate 802 in the region of first set of spacer portions 822. However, in other embodiments, an injection port could be associated with any other portion of molding assembly 800, including top molding plate 802 and/or bottom molding plate 804. Also, in some cases, multiple injection ports can be used at multiple locations of molding assembly 800. For example, in one embodiment, each set of spacer portions of top molding plate 802 could include a separate injection port. In other cases, each molding cavity of bottom molding plate 804 could include a separate injection port.

Next, as shown in FIG. 10, molding material 1000 injected through first set of spacer portions 822. This allows the molding material to fill into gaps 831 to form first supporting structure 180. Moreover, molding material 1000 may flow through first hole 191 and second hole 192 of protruding portion 112 into molding cavity 862. Thus, molding material 1000 is able to cover sidewall portions 115 of first protruding portion 112 to form first connecting portion 174. Also, molding material 1000 may fill into first sub-recess 882 and second sub-recess 884 in order to form first cleat tip portion 171 and second cleat tip portion 172.

As previously discussed, molding material 1000 could comprise any material. In some cases, molding material 1000 comprises a plastic material, such as thermoplastic polyurethane (TPU). In other cases, however, molding material 1000 could be any other material. Molding material 1000 could be selected to achieve desired material properties for cleat tip portions and connecting portions of a cleat member.

Figure 11:
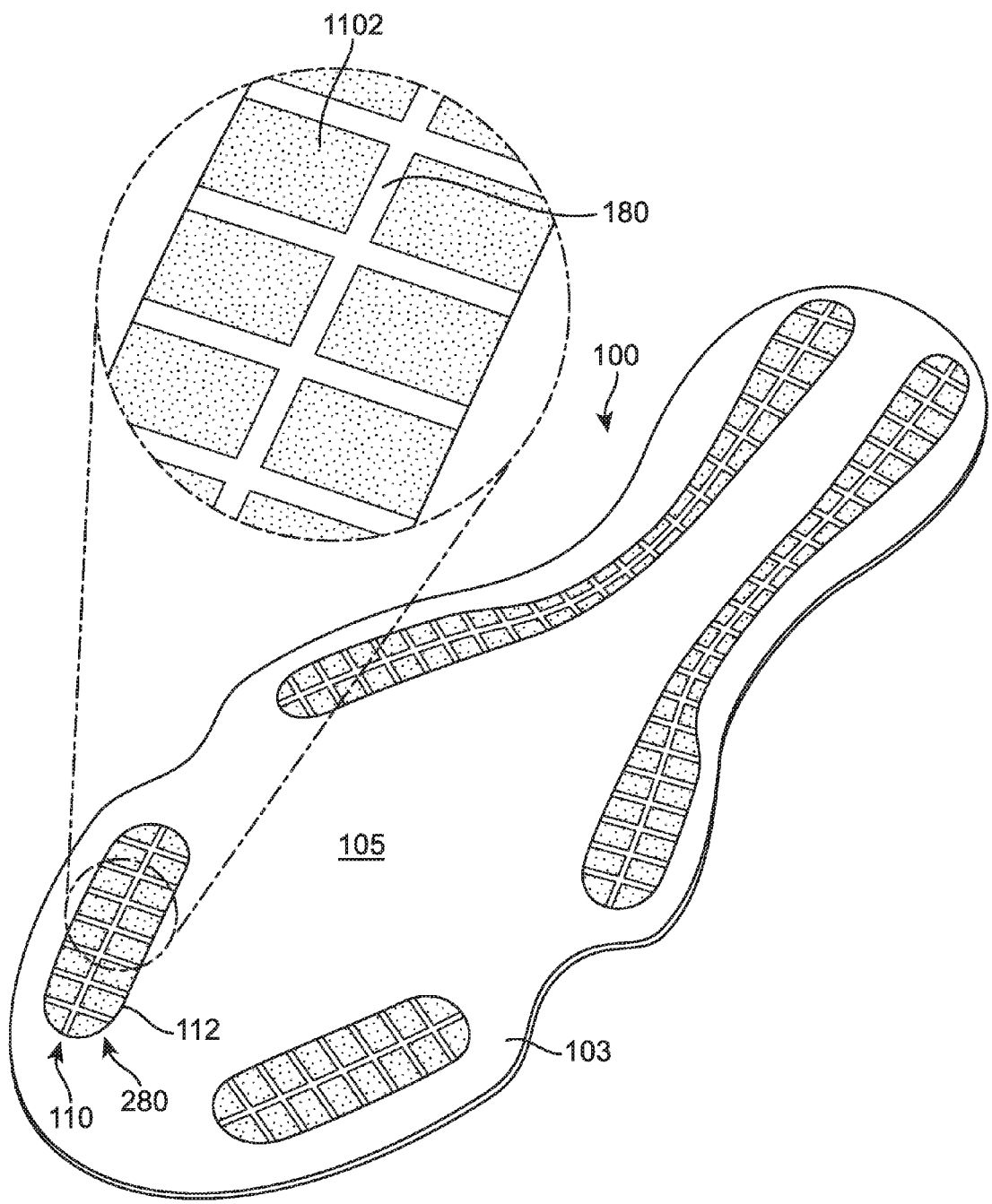
FIG. 11 is an isometric view of an alternative embodiment of a sole structure including filling material.

FIG. 11 illustrates an alternative embodiment of sole structure 100 in which the gaps of supporting structure 180 have been filled with material 1102. In some cases, material 1102 can be inserted into supporting structure 180 after support structure 180 has been formed. In other cases, however, material 1102 could be formed substantially simultaneously with support structure 180, for example using a multi-shot molding process.

Generally, material 1102 could be any material. In some cases, material 1102 could be a foam material. In other cases, material 1102 could be a plastic material. Material 1102 may be selected in order to achieve desired characteristics for cleat member 110. For example, to increase strength and rigidity for cleat member 110, material 1102 could be a relatively rigid material. In other cases, to increase cushioning, material 1102 could be a foam or soft plastic material.

Figure 12:
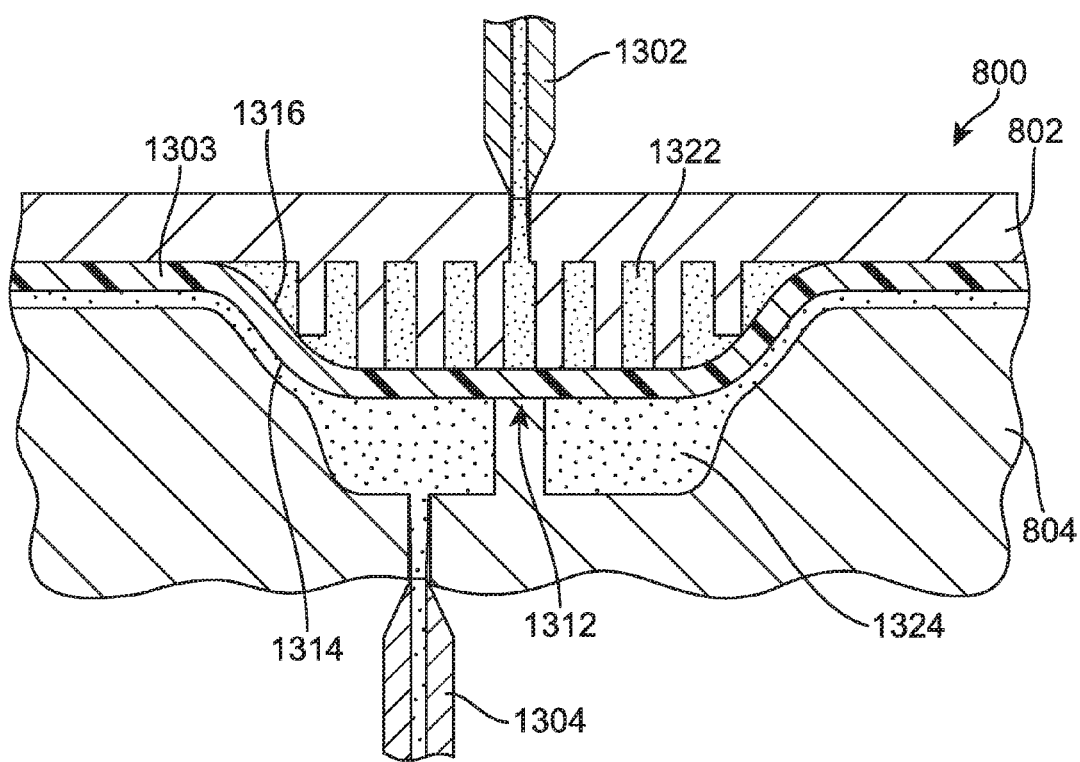
FIG. 12 is a cross sectional view of an embodiment of a process of molding material onto a protruding portion without holes.

FIG. 12 illustrates a cross sectional view of an embodiment of an optional step of a process for making a cleat member. Referring to FIG. 12, in some embodiments, a protruding portion 1312 of a plate member 1303 may be formed without any holes. In such cases, molding assembly 800 can include a first injection nozzle 1302 and a second injection nozzle 1304 associated with top molding plate 802 and bottom molding plate 804. This allows a first material 1322 to be injected into inner portion 1316 of protruding portion 1312 and a second material 1324 to be injected over outer portion 1314 of protruding portion 1312.

In some embodiments, first material 1322 and second material 1324 could be substantially different materials. In some cases, for example, first material 1322 could be substantially more rigid than second material 1324. In other cases, second material 1324 could be substantially more rigid than first material 1322. In still other cases, first material 1322 and second material 1324 could be substantially similar materials. For example, in one embodiment, first material 1322 and second material 1324 could both be TPU.

Although the current embodiment illustrates a single layer of material on outer portion 1314 of protruding portion 1312, other embodiments could incorporate two or more layers. For example, another embodiment may use two layers on outer portion 1314, where the outermost layer could be substantially more abrasion resistant than the layer directly adjacent to outer portion 1314.

Figure 13:
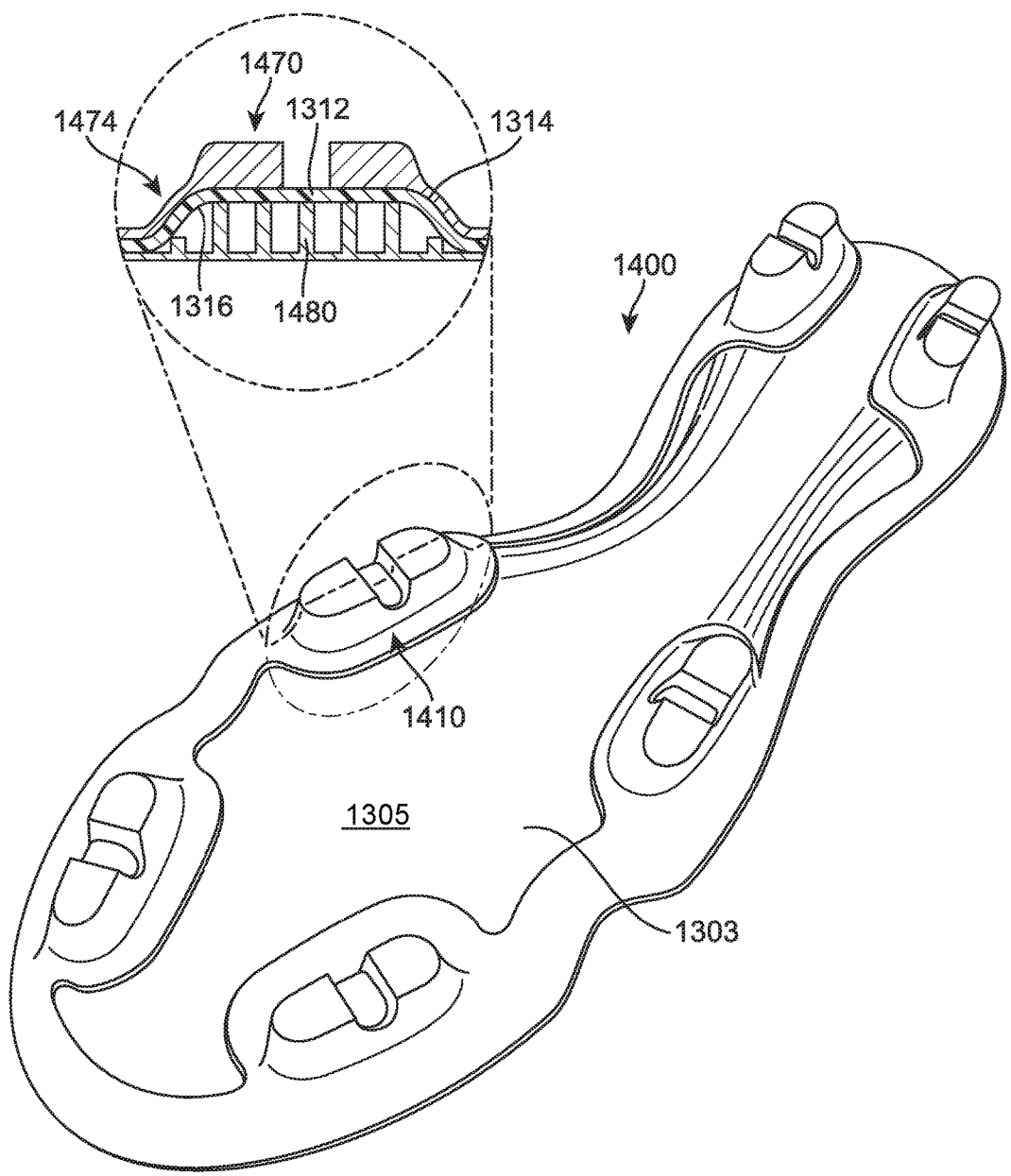
FIG. 13 is an isometric view of an embodiment of a sole structure.

As seen in FIG. 13, the process shown in FIG. 12 provides a method of making a sole structure 1400 with cleat member 1410. Cleat member 1410 includes cleat tip portions 1470 and connecting portion 1474 on outer portion 1314 of protruding portion 1312 associated with outer surface 1305 of plate member 1303. Moreover, supporting structure 1480 is formed on an inner portion 1316 of protruding portion 1312. Moreover, in contrast to the previous embodiments, cleat tip portions 1470 are not connected to supporting structure 1480.

While various embodiments have been described, the description is intended to be exemplary, rather than limiting and it will be apparent to those in the art that many more embodiments and implementations are possible that are within the scope of the current embodiments. Accordingly, the current embodiments are not to be restricted except in light of the attached claims and their equivalents. Features described in one embodiment may or may not be included in other embodiments described herein. Also, various modifications and changes may be made within the scope of the attached claims.

The invention claimed is:

1. A method of making a sole structure for an article of footwear, the method comprising:
    shaping a portion of a plate to form a protruding portion for a cleat member, the protruding portion protruding from a lower surface of the plate and having a convex outer portion and a concave inner portion, wherein the protruding portion includes a tip portion spaced from the lower surface of the plate, and a sidewall extending between the tip portion and the lower surface of the plate;
    forming a hole in the protruding portion, the hole providing fluid communication between the convex outer portion and the concave inner portion; and
    molding a cleat tip portion onto the outer portion and molding a supporting structure within the inner portion;
    wherein the cleat tip portion is formed with and connected to the supporting structure through the hole; and
    wherein the cleat tip portion at least partially covers the convex outer portion on the lower surface of the plate, and includes a connecting portion wrapping around the sidewall of the protruding portion.

2. The method according to claim 1, wherein the plate comprises a composite material.

3. The method according to claim 1, wherein the plate is a carbon composite material.

4. The method according to claim 1, wherein the plate comprises a first material and the cleat tip portion comprises a second material, and wherein the first material is more rigid than the second material.

5. The method according to claim 1, wherein the cleat tip portion is made of thermoplastic polyurethane.

6. The method according to claim 1, wherein the supporting structure comprises a lattice-like structure of intersecting walls with voids between the intersecting walls.

7. A method of making a sole structure, the method comprising:
    forming a plate to include a protruding portion for a cleat member, the protruding portion having a convex outer portion and a concave inner portion, wherein the protruding portion includes a tip portion spaced from a lower surface of the plate, and a sidewall extending between the tip portion and the lower surface of the plate;
    filling the concave inner portion with a molding material to form a supporting structure, wherein the supporting structure is a lattice structure of intersecting walls with voids between the intersecting walls; and
    forming a cleat tip portion on the convex outer portion of the protruding portion, wherein the cleat tip portion at least partially covers the convex outer portion on the lower surface of the plate, and includes a connecting portion wrapping around the sidewall of the protruding portion;
    wherein filling the concave inner portion with the molding material includes placing spacer portions into the concave inner portion and molding around the spacer portions to form the lattice structure.

8. The method according to claim 7, wherein forming the protruding portion of the plate includes applying pressure to the plate.

9. The method according to claim 7, wherein the plate is a composite material and wherein the supporting structure is made of plastic.

10. The method according to claim 7, wherein the cleat tip portion and the supporting structure are formed simultaneously with each other.

11. The method according to claim 10, further comprising forming a hole in the protruding portion to connect the convex outer portion and the concave inner portion in fluid communication.

12. The method according to claim 11, wherein the cleat tip portion and the supporting structure are integrally formed with each other through the hole.

13. The method according to claim 7, wherein the method includes molding a layer onto a peripheral portion of the plate, wherein the layer and the cleat tip portion comprise the same material and are connected together.

14. A method of making a sole structure, the method comprising:
    forming a plate to include a protruding portion for a cleat member, the protruding portion having a convex outer portion and a concave inner portion, wherein the protruding portion includes a tip portion spaced from a lower surface of the plate, and a sidewall extending between the tip portion and the lower surface of the plate;
    filling the concave inner portion with a molding material to form a supporting structure, wherein the supporting structure is a lattice structure of intersecting walls with voids between the intersecting walls; and
    forming a cleat tip portion on the convex outer portion of the protruding portion, wherein the cleat tip portion at least partially covers the convex outer portion on the lower surface of the plate, and includes a connecting portion wrapping around the sidewall of the protruding portion; wherein the cleat tip portion and the supporting structure are formed simultaneously with each other.

15. The method according to claim 14, further comprising forming a hole in the protruding portion to connect the convex outer portion and the concave inner portion in fluid communication.

16. The method according to claim 15, wherein the cleat tip portion and the supporting structure are integrally formed with each other through the hole.

17. The method according to claim 14, wherein forming the protruding portion of the plate includes applying pressure to the plate.

18. The method according to claim 14, wherein filling the concave inner portion with the molding material includes placing spacer portions into the concave inner portion and molding around the spacer portions to form the lattice structure.

19. The method according to claim 14, wherein the method includes molding a layer onto a peripheral portion of the plate, wherein the layer and the cleat tip portion comprise the same material and are connected together.

* * * * *